(12) United States Patent
Houska et al.

(10) Patent No.: US 6,542,181 B1
(45) Date of Patent: Apr. 1, 2003

(54) HIGH PERFORMANCE AERIAL VIDEOCAMERA SYSTEM

(75) Inventors: Richard V. Houska, Boyce, VA (US); David J. Wallace, Annapolis, MD (US)

(73) Assignee: Aerial Videocamera Systems, Inc., Boyce, VA (US)

(*) Notice: Subject to any disclaimer, the term of this patent is extended or adjusted under 35 U.S.C. 154(b) by 194 days.

(21) Appl. No.: 09/586,035

(22) Filed: Jun. 2, 2000

Related U.S. Application Data (60) Provisional application No. 60/137,686, filed on Jun. 4, 1999.

(51) Int. Cl.[7] .................................................. H04N 7/18
(52) U.S. Cl. ......................... 348/144; 348/61; 348/208
(58) Field of Search ................................ 348/144, 143, 348/148, 61, 208

(56) References Cited

U.S. PATENT DOCUMENTS

| | | | |
|---|---|---|---|
| 3,715,953 A | * 2/1973 | Allan | 244/3.16 |
| 4,488,174 A | * 12/1984 | Mitchell et al. | 345/643 |
| 4,654,876 A | * 3/1987 | Atkins | 348/147 |
| 4,710,819 A | * 12/1987 | Brown | 212/76 |
| 5,897,223 A | * 4/1999 | Tritchew et al. | 348/144 |

* cited by examiner

*Primary Examiner*—Vu Le
(74) *Attorney, Agent, or Firm*—Weingarten, Schurgin, Gagnebin & Lebovici LLP (57) ABSTRACT

An aerial videocamera system for installation on an airplane comprises a videocamera/recorder which has an internal stabilization system, a camera mounting enclosure that provides a weather-proof enclosure with vibration isolation for the videocamera, and a pan/tilt head that bolts to a spar attachment plate and provides variable control to the camera in both the pan and tilt axis. The spar attachment plate is secured to the airplane and provides an access point for cabling carrying power, position control signals, and camera video and control to connect the externally mounted systems to components housed in the cabin. In the cabin, a pan/tilt controller processes input control signals from a joystick mounted on a control wand and outputs control and power signals to control the position of the videocamera. The control wand precisely positions the remote camera and controls the camera functions. A power package draws DC power from the airplane battery and converts it to AC power for the active components.

24 Claims, 7 Drawing Sheets

HIGH PERFORMANCE AERIAL VIDEOCAMERA SYSTEM

CROSS REFERENCE TO RELATED APPLICATIONS

Applicant claims priority under 35 U.S.C. Section 119(e) to U.S. Provisional Application Serial No. 60/137,686 filed Jun. 4, 1999, entitled: "High Performance Aerial Videocamera SYSTEM".

STATEMENT REGARDING FEDERALLY SPONSORED RESEARCH OR DEVELOPMENT

N/A

BACKGROUND OF THE INVENTION

Aerial Photography has application both in art and in business. All high performance aerial videocamera systems require effective vibration compensation of high frequency, airplane and wind vibration components for smooth, jitter-free operation. The current state of the art for effective compensation is only achieved using some form of gyro-stabilized platform, usually for the camera mount. While gyro-stabilization is effective, this method of compensation is complex and expensive, with complete systems often costing more than the airplane itself.

BRIEF SUMMARY OF THE INVENTION

A modular and portable high performance aerial videocamera system is provided in accordance with the invention to be quickly attached to the underside of an airplane such as a Cessna 150 or 172. This videocamera system achieves a level of performance comparable to a gyro-stabilized system at a much lower cost.

The modular system includes a videocamera/recorder which has an internal stabilization system, a camera mounting enclosure that provides a weather-proof enclosure with vibration isolation for the videocamera, and a pan/tilt head that bolts to a spar attachment plate and provides variable control to the camera in both the pan and tilt axis. The spar attachment plate is secured to the airplane and provides an access point for cabling carrying power, position control signals, and camera video and control to connect the externally mounted systems to components housed in the cabin. In the cabin, a pan/tilt controller processes input control signals from a joystick mounted on a control wand and outputs control and power signals to control the position of the videocamera. The control wand precisely positions the remote camera and controls the camera functions. A power package draws DC power from the airplane battery and converts it to AC power for the active components.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

Aerial videocameras and the use of video photography have been limited by the prior art that requires gyroscopically stabilized cameras to produce video recordings that adequately filter out the vibration of the airplane and the environmental conditions around the airplane. These prior art systems are very costly and usually are integrally mounted with the airplane. Therefore, any aerial photography assignment requires that a specially configured airplane travel to the location with a crew.

In contrast to the prior art, the present invention is a modular high performance aerial videocamera system that can be installed in any small airplane, especially with a high wing configuration. The system is low cost compared to prior art systems because it utilizes high performance commercial components where possible, operates from the power available through the power outlet on the aircraft instrument panel and stabilizes the videocamera using passive cushioning to dynamically isolate the videocamera from the airplane. This dynamic isolation effectively augments the active, electrical motion compensation provided by the video camera itself.

Figure 1A:
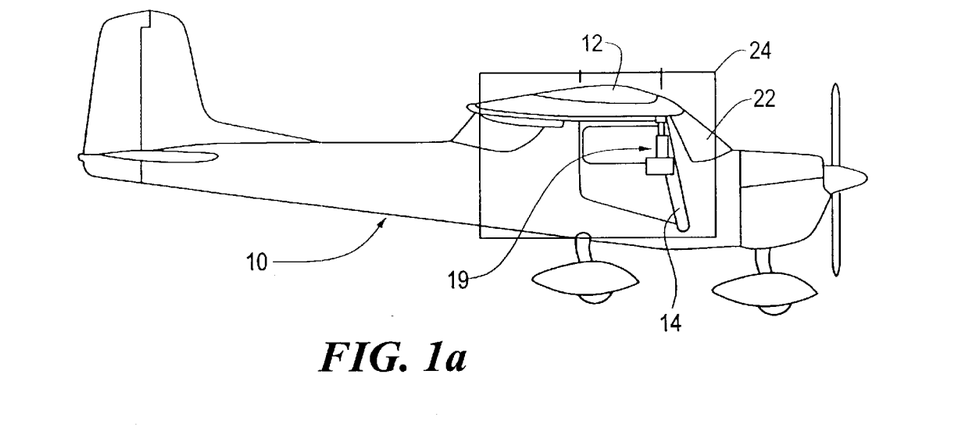
FIG. 1a is a side view of and airplane with wing-mounted aerial camera subsystem in place.
Figure 1B:
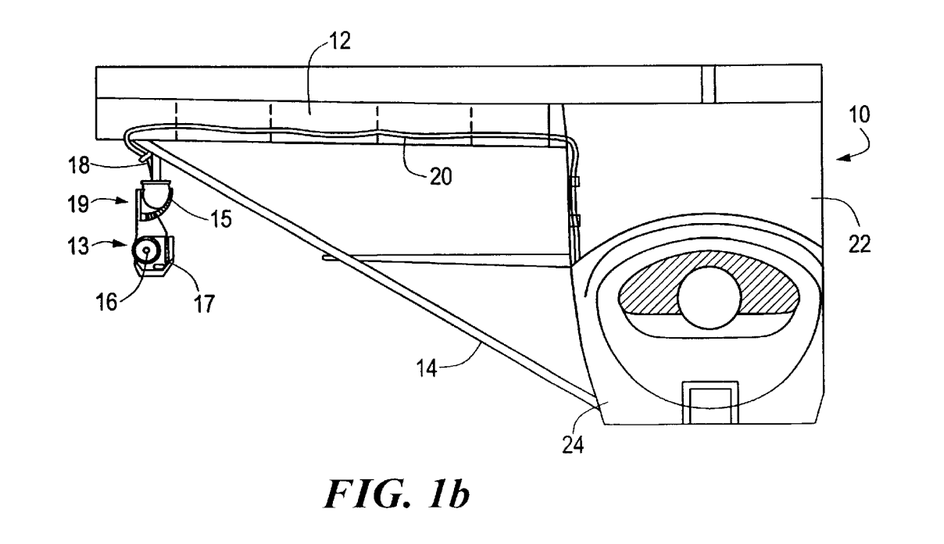
FIG. 1b is a front view of the airplane with wing-mounted aerial camera subsystem in place.

FIG. 1a illustrates a side view of an airplane 10, in this case a Cessna 150. The airplane incorporates a high wing 12, which provides space under the wing with an unobstructed view, while an operator in the cockpit 22 can see the underside of the wing 12. In this embodiment, the wing is supported by a strut 14 that braces the outer region of the wing against the body 24 of the airplane. Video pod 19 is suspended from the wing 12/strut 14 junction. Although the system is illustrated using the Cessna 150, it can be adapted to any airplane designed to perform within the system's maximum speed of 100 knots. Mounting arrangements in other aircraft (or other parts of this type of airplane) are possible provided there is sufficient clearance. It is not a requirement that the pilot be able to see the video pod 19. FIG. 1b is a front view of the area highlighted by the box 24 of FIG. 1a. This figure illustrates the main cockpit 22, wing 12 and strut 14. Video pod 19 is suspended from the wing at the juncture of the wing 12 and strut 14. The video pod includes a mounting assembly 18, supporting a pan/tilt assembly 15, that moves a video camera 16 environmentally protected by a mounting enclosure 17. The video pod active components are connected to an onboard electronics package, mounted in the cockpit 22, via cables 20. The pilot or another operator in the cockpit 22 controls the operation of the video pod 19.

Figure 2A:
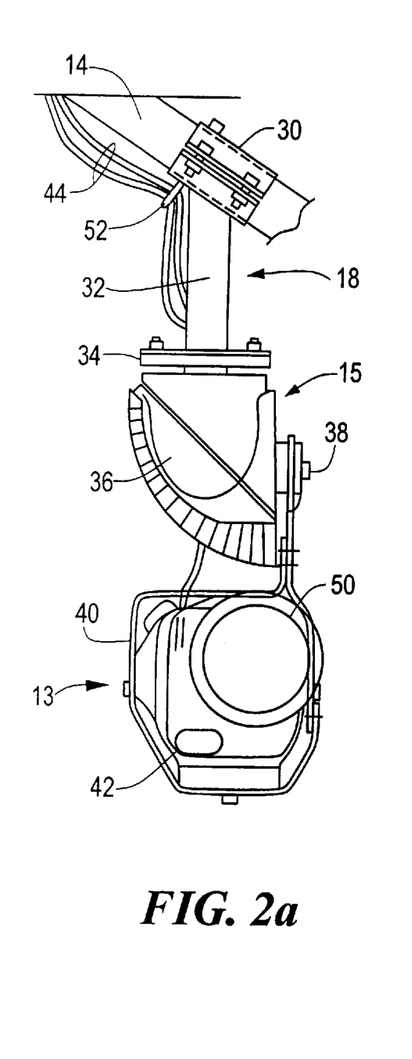
FIG. 2a is a front view of the wing-mounted subsystem.

Details of the Cessna 150 type of mounting of the camera are shown in FIG. 2, where FIG. 2a is the front view of the video pod assembly 19. A tie down ring 52 is already present near the junction of the strut 14 and the wing 12 in many of these airplanes. Strut 14 provides support for the sparred attachment assembly 18 that is composed of the clamping mechanism 30, the spar 32 and the mounting plate 34. The pan/tilt motor head 15 is attached to the mounting plate 34. The mounting for the camera assembly 13 is connected to the pointing attachment 38 of the pan/tilt motor head 15.

All parts of the mounting assembly 19 are made of stainless steel. The clamping mechanism 30 and mounting plate 34 are welded to the stainless steel spar 32. The clamping mechanism 30 clamps around the strut 14, and may use the tie down ring 52 as an additional clamp and positive connection to the strut. The clamping mechanism provides a quickly secured assembly that can be easily removed, but is also sturdy enough to be permanently mounted to the airplane. The tie down ring may optionally be used as a lead for cabling 44 between the onboard electronics and the camera 16 and pan/tilt head electronics 36. The mounting plate 34 is connected to the end of the spar 32 away from the mounting clamp. The entire sparred attachment assembly is a rigid, high tensile strength assembly that resists deflection by the wind forces striking it. The sparred attachment assembly does not damp airplane vibrations but transmits any wing/strut vibrations caused by the airplane engine to the mounting plate 34.

The pan/tilt assembly 15 bolts directly to the mounting plate 34 and is composed of a pan/tilt motor head 36 and a pointing mount 38. The pan/tilt motor head 36 is a commercial unit that in a preferred embodiment covers up to 360 degrees in the pan axis and 180 degrees in the tilt axis. The pan/tilt head supports a camera assembly weighing up to 20 Kg. The preferred pan/tilt head is able to move the maximum load against the force generated by airspeeds of up to 100 knots at speeds of 0 to 10° per sec in each and/or both axes. The pointing mount 38 is the portion of the pan/tilt assembly 15 that is moved and provides support for the camera assembly 13. The pan/tilt motor head 36 receives control signals from the onboard control pack via the cables 44 and moves pointing mount 38 in response to commands transmitted over the cables.

Pointing mount 38 receives the clamping collar 40 of the camera assembly 13. The clamping collar 40 surrounds and is securely attached to the camera enclosure 42. Clamping collar 40 is secured to the pointing mount 38 by bolts that are welded to the clamping collar 40. The camera enclosure 42 incorporates a clear window 50 through which the camera 16 can capture images. The camera enclosure 42 can be any weatherproof enclosure made to hold the chosen videocamera 16 and be adapted to the clamping collar 40. In one embodiment, the camera enclosure 42 is made of Lexan™. The camera enclosure 42 is adapted to accept power, control and video signals connections for the videocamera 16.

Figure 2B:
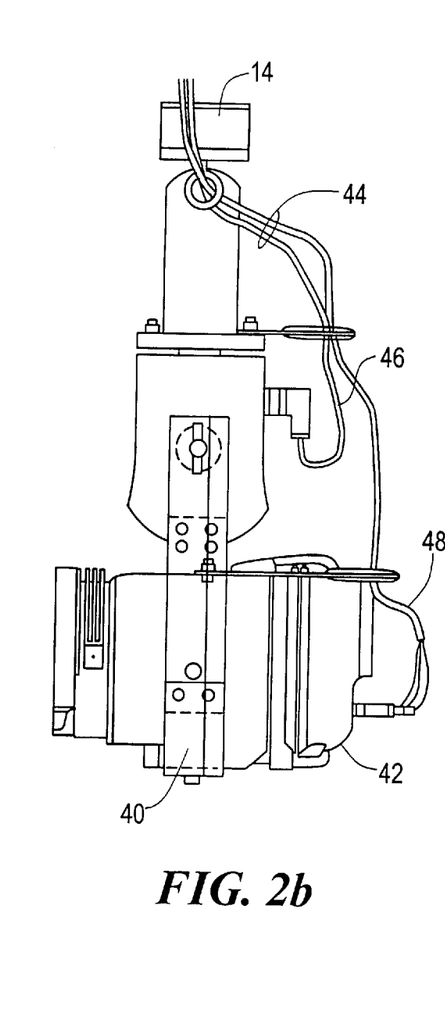
FIG. 2b is a side view of the wing-mounted subsystem.
Figure 2C:
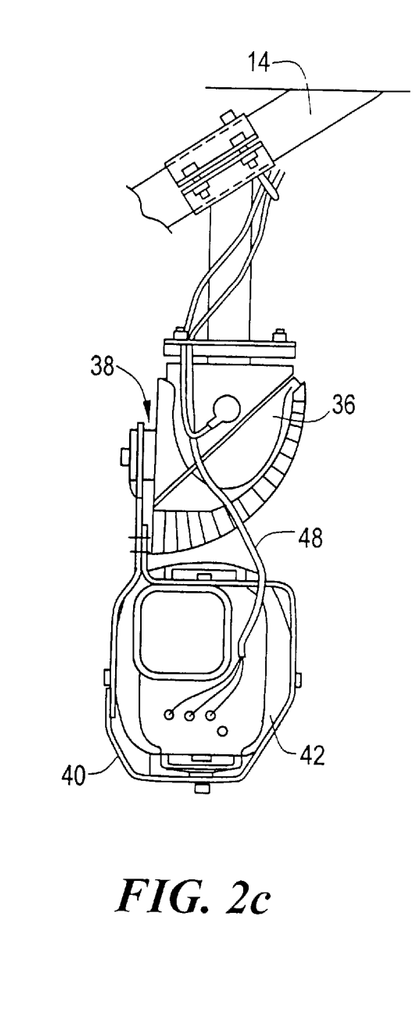
FIG. 2c is a back view of the wing-mounted subsystem.

Side view FIG. 2b and back view FIG. 2c illustrate that the cables 44 coming from the onboard control pack are composed of two distinct cables 46 and 48. The pan/tilt cable set 46 plugs into the pan/tilt motor assembly 36 while the video cables 48 plug into the videocamera 16 through the camera enclosure 42. The entire pan/tilt assembly 15 has no damping characteristics so any vibration transmitted through the mounting plate 34 is transmitted to the camera enclosure 42 via the pointing mount 38.

Figure 3:
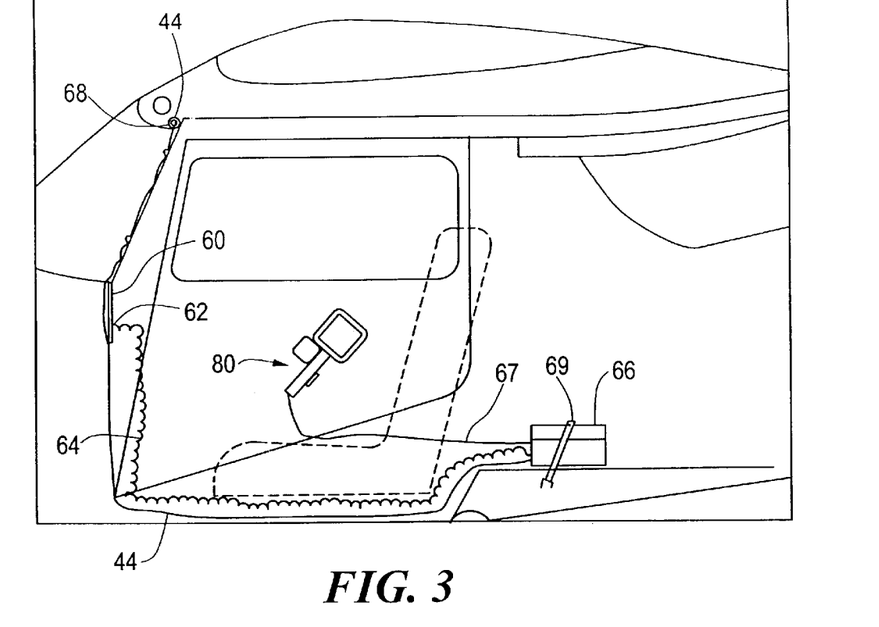
FIG. 3 is a side view of the inboard system mounted in the airplane cabin.
Figure 4:
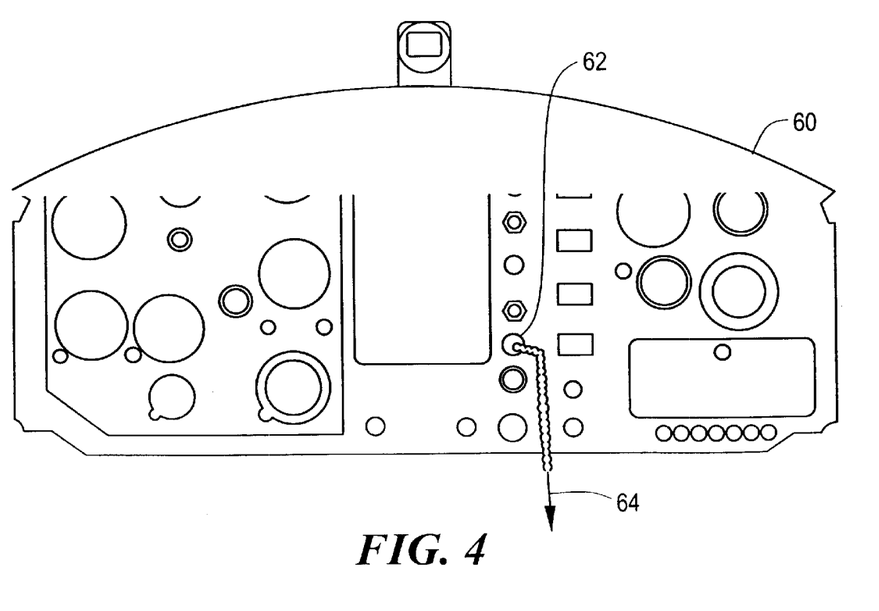
FIG. 4 is a front view of an airplane instrument panel.

FIG. 3 is a side view of the airplane cockpit 22 illustrating the placement and interconnection of the onboard control pack 62 relative to the cockpit components. The onboard control pack 62 encloses all of the electronics needed for the high performance aerial camera system, draws power from the airplane through the instrument panel 60 and is mounted internal to the cabin. On the instrument panel 60, a DC outlet 62 makes airplane power available. A power cable 64 takes the DC power from the outlet 62 to the onboard control pack 66 where it is converted to AC voltage for use by the other electronics. While Airplane DC voltages of 12 VDC and 24 VDC are currently known, other DC voltages can be accommodated by changing the conversion range of the power inverter incorporated in the onboard control pack 62. In the Cessna 150, Cables 44 exit the onboard control pack 66 and are dressed around the edge of the cockpit 22 and exit through an access port 68 to travel through the wing 12 to the strut mount location. Similar routings may be configured for alternate mounting locations. A signal cable 67 remains in the cockpit 22 and connects the onboard control pack 66 to the control wand 80 that is placed to be controlled by a person sitting in one of the front seats. The onboard control pack 66 is configured so that it may be secured to a rear location by tie-down straps 69 or other similar mechanism. FIG. 4 illustrates the airplane instrumentation panel 60 with the 12-volt connector 62 and a power cable going toward the onboard control pack 66.

Figure 5:
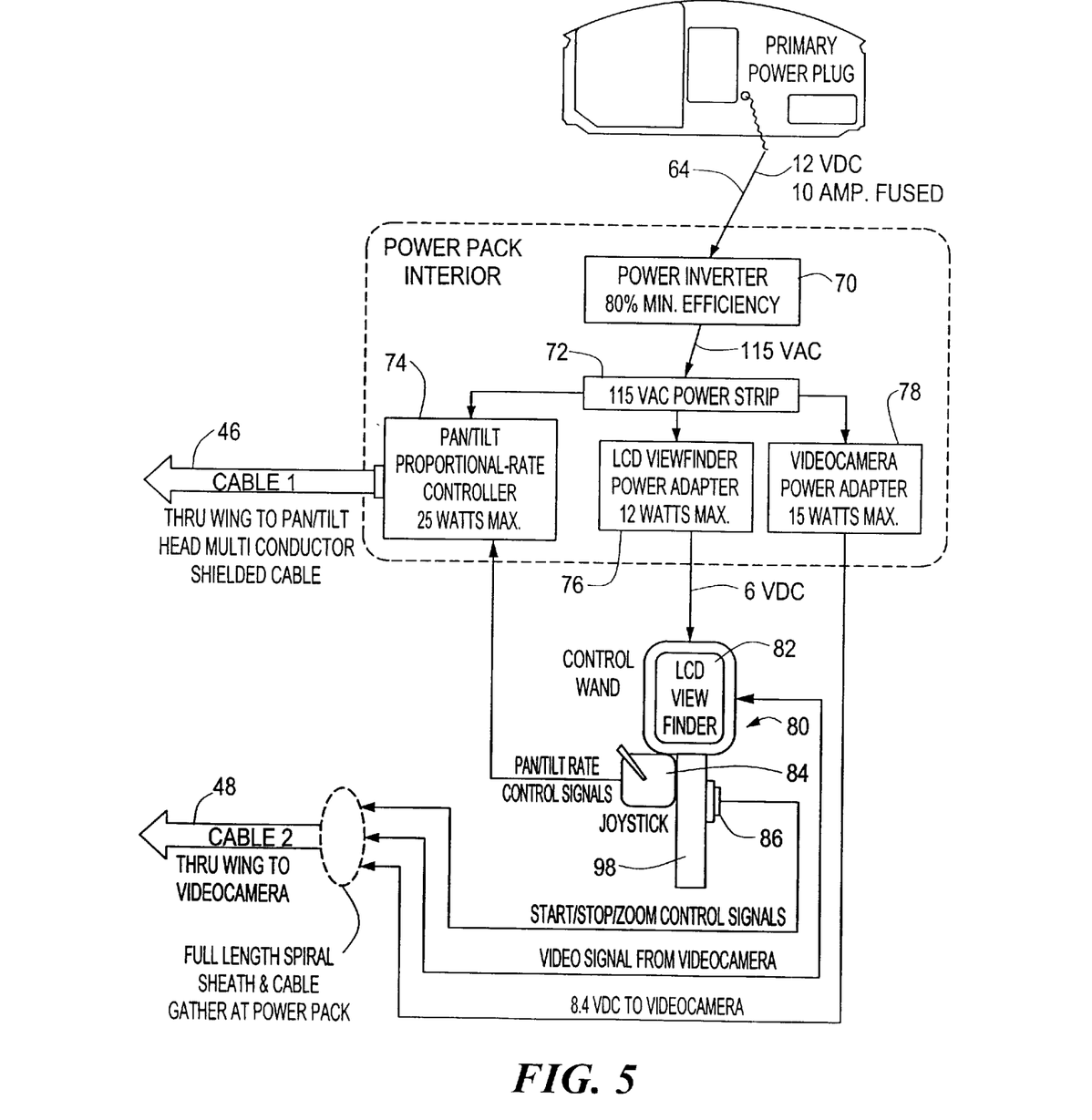
FIG. 5 is a schematic diagram of the interconnected components of the system.

FIG. 5 illustrates the interconnection of the components within the system. Cable 64 brings DC power from the instrument panel 60 to a power inverter 70 mounted in the onboard control pack 66. The power inverter 70 converts the DC power into 115 Volt AC and supplies that AC power to an AC power strip 72 also contained in the onboard control pack 66. The power adapter for the video camera 78, for a viewfinder display 76 and for the pan/tilt controller 74 all plug into the power strip 72. The onboard control pack 66 is accommodates mounting the pan/tilt controller 74 in addition to the power-related components.

Figure 6A:
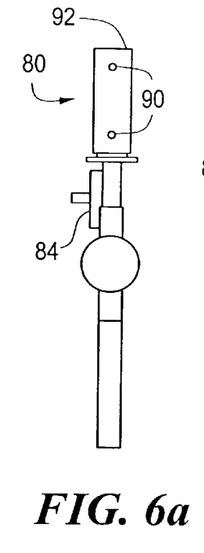
FIG. 6a is a front view of the control wand.
Figures 6B, 7A:
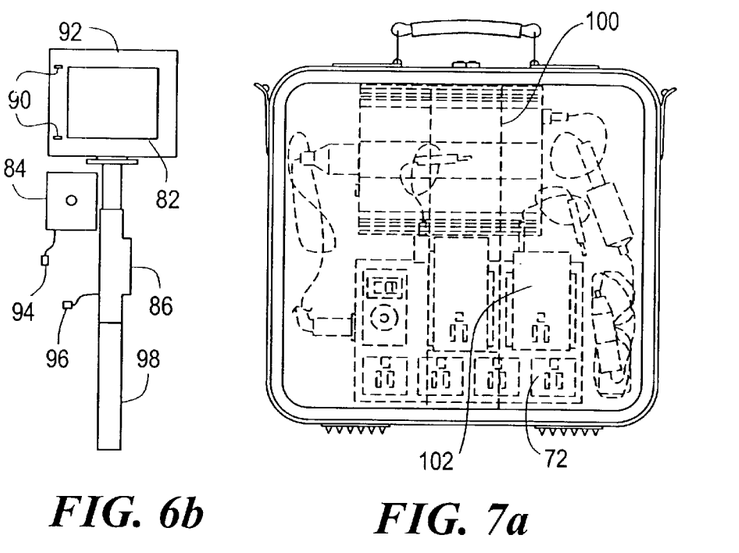
FIG. 6b is a side view of the control wand.
FIGS. 7a, 7b and 7c are the top, side and bottom views respectively of one implementation of a power pack of the inboard subsystem.

The control wand 80, physically illustrated in FIGS. 6a and 6b, incorporates a joystick 84, a camera view screen 82, and start/stop and zoom control 86 for the videocamera 16. The control wand is stabilized by an attachment means such as a Velcro™ strap around the leg or a foot to be placed beneath the operator's leg. The joystick 84 generates very smooth pan/tilt rate control signals that are sent via the signal cable 67 to the pan/tilt controller 74. The joystick 84 preferably will return to the neutral position when not actively deflected. The direction of the camera motion will reflect the direction indicated by the joystick 84 while the rate of motion will be proportional to the extent of displacement from neutral. The camera view screen 82, preferably a LCD view screen, is fed directly from the video signal from the videocamera 16. The start/stop and zoom control 86 signals meet the videocamera specifications, using the LANC control signal protocol, for remote signals and cause the videocamera to begin recording, stop recording and adjust the focal length.

In a preferred embodiment, the pan/tilt controller 74 and joystick 84 combination are critical to providing acceptable video quality when the operator is adjusting the camera position. When the pan/tilt controller 74 provides true proportional rate movement, based on the extent of displacement of the joystick 84, the operator has minimal problems operating the videocamera in a jitter-free and jerk-free manner. The pan/tilt controller and assembly preferred is a commercially available product that allows true proportional rate movement. Alternate pan/tilt controllers and assembly can be used provided the range of motion and discernable motion of the camera produce an acceptable recording.

The signals between the camera assembly 13 and the onboard control pack 62 are dressed from the access port 68 for the pod assembly 19, around the interior edges of the cockpit 22, to the region near the onboard control pack 66. The power connections and pan/tilt motor control signals terminate at connectors on the onboard control pack 66 to facilitate the modular and easy installation of the system. The video control signals break out of the full length spiral sheath that has held all the cables together to this point and terminate at a connector in the vicinity of the control wand 80. The cable that traverses the airplane 10 conforms to Mil. Spec. standards and is encased in a full length durable, heat-resistant polymer spiral sheath.

When operating the control wand 80, an operator views what the camera is seeing on the LCD viewscreen 82 and changes where the camera is pointing by sending controls to the pan/tilt motor 36 using the joy stick 84. Cables to the pan/tilt head motor control exit from the proportional rate controller 74 via cables 46. The operator starts and stops recording using the start/stop switch 86 and adjusts the focal length using the zoom control switch 86. The camera control switches are mounted on the stock 98 of the control wand 80. Signals between the control wand 80 and the video subsystem are carried on cable 48.

FIGS. 6a and 6b further illustrate the control wand 80. A side view, FIG. 6a, shows the LCD display enclosure 92 and the electronic and signal connections to the LCD display 90. Joy stick 84 is positioned directly beneath the LCD display 82 and provided with a connector 94 to facilitate modularity while enabling connection to the pan/tilt controller 74. Video camera start/stop and zoom control 86 similarly has a connector 96 on its controller cables to provide for easy installation.

Figure 7B:
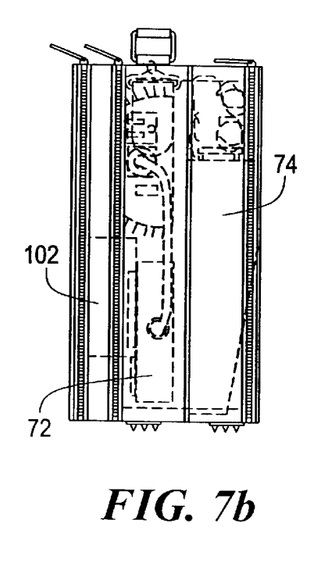
Figure 7C:
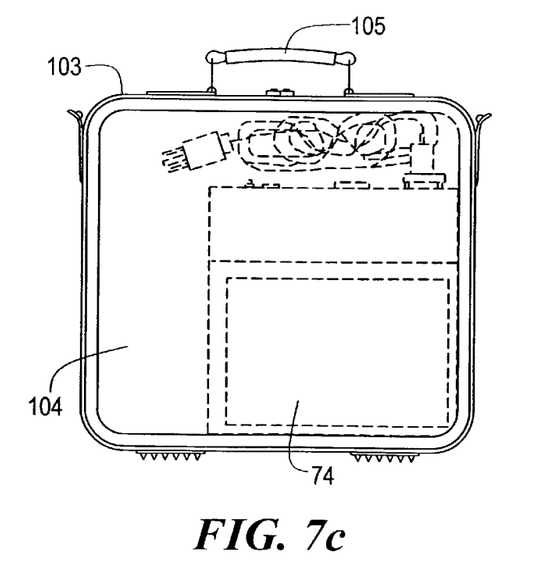

In FIGS. 7a, 7b and 7c one configuration of the packing of components in the onboard control pack 66 is illustrated. Looking at the bottom view, the pan/tilt controller 74 is against the bottom with sufficient space next to it to allow the control wand 80 to be placed in the space 104. Atop the controller 74 is the power equipment including the power inverter 100, the power strip 72 and room for the power adapters 102 for all three of the pan/tilt motor assembly 74, the videocamera 16 and the LCD display 82. The components are most conveniently mounted in an enclosure 103 with a handle 105 to facilitate connection, installation and transport of the system.

Figure 8:
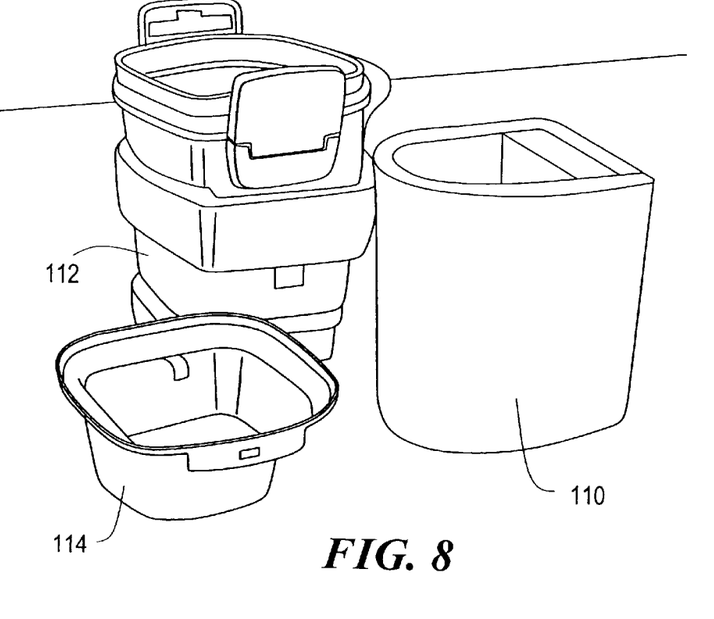
FIG. 8 is a pictorial view of a foam sleeve and camera enclosure for a video camera.
Figure 9:
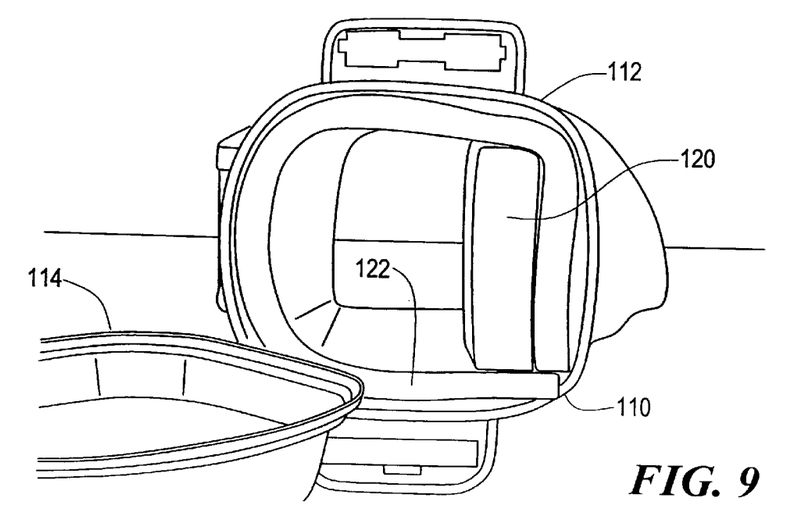
FIG. 9 is a pictorial view of a foam sleeve fitted in a camera enclosure for a video camera.

The camera enclosure system 42, as shown in FIG. 8, is an industry available component typically consisting of two pieces, a camera mounting piece 112 and an end securing piece 114. The camera enclosure system 42 keeps the environmental elements away from the camera 16. In addition to these two pieces, the camera enclosure system 42 includes a foam sleeve 110 to dampen the vibrations of the airplane so that the vibrations will not be evident on the video. In FIG. 9 the foam 110 is shown placed inside the camera mounting piece 112. Note that in this embodiment there is a thicker side 120 of the foam 110 to accommodate the orientation of the camera while the remainder of the camera is surrounded by uniform thickness 122. Alternate configurations of foam 110 can accommodate the physical parameters of other enclosures. The foam 110 must at all times be thick enough to prevent contact between the camera 16 and the camera enclosure 42 even under maximum compression from camera weight and the vibration of the airplane.

Figure 10A:
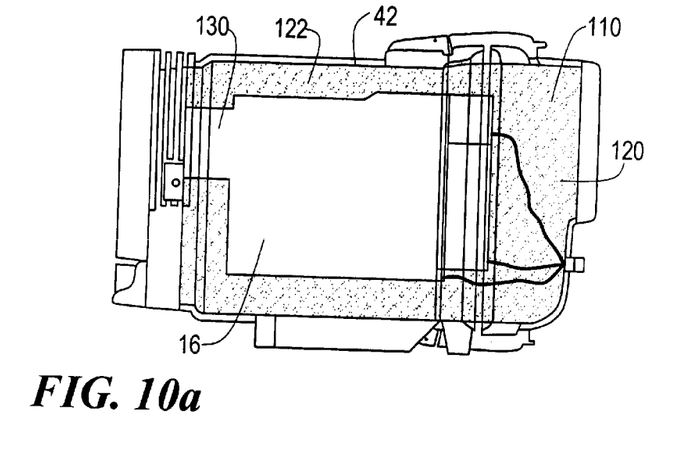
FIGS. 10a and 10b are the side and rear view of a video camera cradled by the foam sleeve in the camera enclosure.
Figure 10B:
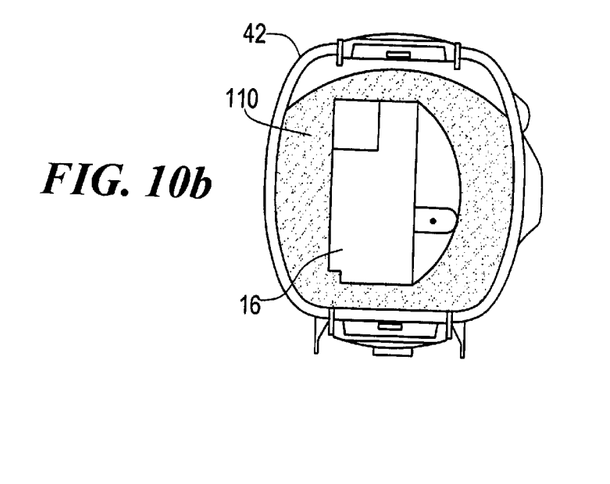

FIGS. 10a and 10b show the configuration of the camera enclosure 42 as utilized with camera 16 installed. The camera 16 is placed with its lens 130 adjacent to the window 50 in the camera enclosure 42. Foam 120 and 122 suspends the camera in the enclosure with no contact between the actual enclosure mechanics and the camera. The foam sleeve 110 presents a snug fit for the camera when installed in the camera enclosure 42. The foam sleeve is configured with a lip near the window 50 so that it prevents contact between the window 50 and the lens 130.

The camera selected for the application can be selected from commercially available videocameras. Presently, digital videocameras are preferred because they incorporate more functional motion compensation systems and offer a digital zoom feature that has utility. In the preferred embodiment, the camera is a commercially available digital videocamera supporting the LANC remote control protocol, remote video monitoring, superior electrical motion compensation and a shape conducive to easy insertion and removal. Optical characteristics such as zoom range, light sensitivity, and recording media can be selected to accommodate the task objective.

The vibration compensation system for the high performance videocamera system utilizes two main components—the entire mounting configuration including the foam sleeve and the motion compensation capability built into the camera. The camera mounting configuration is rigidly constructed so that any airplane vibration is transmitted to the camera enclosure 42 and any additional vibration induced in the mounting configuration by interaction with high frequency turbulence is minimized. Since the airplane vibrations exceed the limits of the videocamera motion compensation system, the foam sleeve 110 is designed to absorb most of the vibration so that the vibration the videocamera 16 experiences is within the specifications of the videocamera motion compensation system.

The foam used to create the foam sleeve 110 is precisely chosen to dampen the high frequency component of any vibration reaching the camera enclosure 42 to a value below the compensation level. The vibration reaching the camera enclosure 42 is the sum of the vibrations from the airplane motor and high frequency turbulence affecting the airplane. For the purpose of selecting the foam, high frequency is defined as any source at greater than approximately 25 Hz. The foam characteristics are determined by modeling the action of the suspended camera mathematically.

Figure 11:
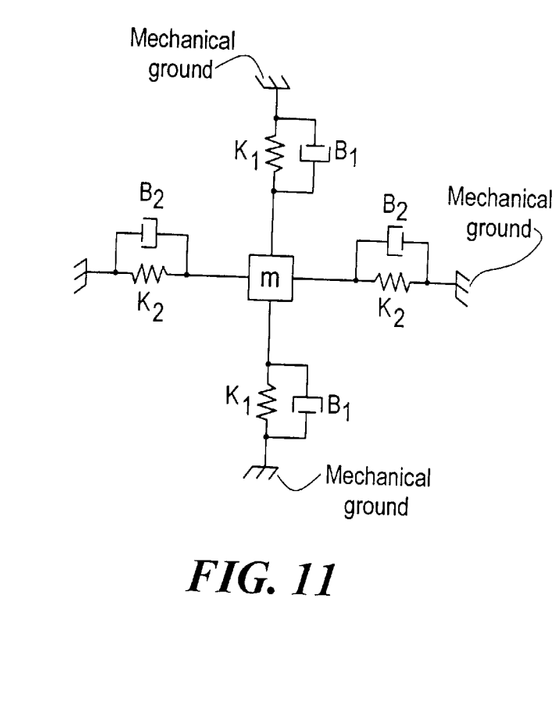
FIG. 11 is a two dimensional schematic model of the suspended camera.

FIG. 11 illustrates a linear dynamic model for the camera system in its foam sleeve, perturbed by a sinusoidal forcing function Asin(wt). Such a model can readily be extended to cover the three-dimensional situation. The camera mass M is balanced in the four directions by forces that are represented by a spring K and a damper B. In particular, K is the spring constant of the foam whereas B represents the viscous damping co-efficient of the foam. In steady state, the system will oscillate at the frequency w. The amplitude of the oscillation will be determined by A, w, k1 and B1, where the relationship among this parameters cane be found by solving differential equation 1.

$$F_{ext} = m\ddot{x} = A\sin(wt) - 2k_1 x - 2B_1 \dot{x} \qquad (EQ.\ 1)$$

where
  w=airframe vibration frequency
  A=amplitude of vibration
  x=displacement from center equilibrium of mass m.
Based on this model, the properties, k and B, needed to stabilize the camera can be calculated.

As detailed above, the foam is selected to dampen vibrations above approximately 25 Hz because the videocamera system alone does not provide sufficient compensation. The motion compensation system built into high performance video cameras is used to eliminate the remaining vibrations above approx. 25 Hz in the system. This motion compensation system typically is set up to cut off all frequencies above a threshold and only allow the frequencies below that threshold to affect the video. In particular, the cut off frequency is chosen to allow panning of the landscape or tilting of the camera to get a different perspective while removing the jitter of, for instance, a shaky arm, or in this case a vibrating airplane. However, the motion compensation in the videocamera can only compensate for a certain amount of high frequency vibration and camera alone in the airplane environment would exceed that amount. Suspending the camera in foam selected for the appropriate damping characteristics is vital to allowing the camera's motion compensating system to work.

The 25 Hz cutoff frequency is an optimum in the range of 23–28 Hz that will provide adequate performance. High quality digital videocameras generally incorporate vibration compensation with a cutoff frequency, but the cutoff frequency is generally not specified. Therefore, the videocameras used in the invention are selected to meet this criterion.

Having described preferred embodiments of the invention it will now become apparent to those of ordinary skill in the art that other embodiments incorporating these concepts may be used. Accordingly, it is submitted that the invention should not be limited by the described embodiments but rather should encompass the spirit and full scope of the appended claims.

What is claimed is:

1. An aerial videocamera system adapted for installation on an airplane comprising:
   a externally-mounted subsystem having a vibration compensation system and a videocamera system, said vibration compensation system having structurally integrated components and dynamically coupled components, said videocamera system adapted for positioning and controlling a videocamera in a protective enclosure, wherein said structurally integrated components resist turbulence induced vibration and transmit airplane vibration, said structurally integrated components comprise:
      a rigid mounting assembly adapted to be detachably mounted to an external surface of said airplane and provide a mounting plate;
      a pan/tilt assembly adapted to mount on said mounting plate, said pan/tilt assembly adapted to position a payload attached to a positioning mount; and
      a camera assembly attached to said positioning mount whereby said camera assembly receives minimal turbulence induced vibration and all airplane vibration;
   an onboard subsystem comprising a power subassembly able to adapt airplane power for use by electronic components and an operator assembly able to control camera positioning, imaging and control; and
   cabling interconnecting said externally-mounted subsystem and said onboard subsystem;
   whereby an operator in a cockpit of said airplane is able to control said videocamera producing vibration free images.

2. The aerial videocamera system of claim 1 wherein said rigid mounting assembly comprises a strut attachment mechanism, a spar and a mounting plate.

3. The aerial videocamera system of claim 1 wherein said dynamically coupled components include;
   a vibration absorption sleeve sheathing said videocamera and filling a space between said videocamera and said protective enclosure; said vibration absorption sleeve having a spring constant and viscous damping coefficient selected to dampen a vibration of said high-wing aircraft to a predetermined level; and
   a camera motion compensation system able to compensate for said predetermined level of vibration.

4. The aerial videocamera system of claim 1 wherein said operator assembly includes:
   a control wand adapted to provide mounting and ready access and manipulation of videocamera controls;
   an integrated color display mounted on said control wand facing said operator, said integrated color display adapted to show what said videocamera is recording;
   a pan/tilt joystick positioned on said control wand to facilitate manipulation by a hand, said pan/tilt joystick adapted to utilize a pan/tilt controller to control a pan/tilt assembly to position said videocamera;
   a camera zoom control positioned on said control wand to be actuated, said camera zoom control adapted to control the zoom of said videocamera; and
   a camera start/stop control positioned on said control wand to be activated, said camera start/stop control adapted to start and stop recording by said videocamera.

5. An aerial videocamera kit adapted for installation on an airplane comprising:
   a videocamera/recorder adapted to be operated remotely, and provide motion compensation for frequencies greater than a predetermined threshold;
   a camera mounting enclosure adapted to allow operation of said videocamera, provide a weather-proof case for said videocamera, provide vibration isolation for said videocamera and receive airplane vibrations through a mounting point of a collar around said camera mounting enclosure;
   a pan/tilt head adapted to variably position a mounting bracket in a pan and a tilt axis in response to input control signals, said mounting bracket adapted to support said camera mounting enclosure through said mounting point;
   a spar attachment assembly adapted to be secured to an airplane and provide a strong attachment point for said pan/tilt head, said spar attachment assembly transmitting vibrations from said airplane to said strong attachment point;
   a control wand adapted for precise remote camera positioning and control, said control wand located in a cockpit of said airplane;
   a pan/tilt assembly adapted to receive signals from said control wand and translate said signals into control commands for said pan/tilt head;
   a power package adapted to draw DC power from an airplane battery and supply AC power to said control wand, videocamera and pan/tilt assembly and head; and
   cabling adapted to carry power, position control signals, and camera signals among said control wand, pan/tilt controller, video camera, pan/tilt head and power package, said cabling sufficient to be dressed from said cockpit through an access port and to said camera mounting enclosure and pan/tilt head.

6. The aerial videocamera kit of claim 5 wherein said videocamera recorder is a digital videocamera recorder.

7. The aerial videocamera kit of claim 5 wherein said motion compensation system operates for frequencies greater than 23–28 Hz.

8. The aerial videocamera kit of claim 5 wherein said vibration isolation includes a foam sleeve with predetermined spring constant and viscous damping coefficient.

9. The aerial videocamera kit of claim 5 wherein said mounting bracket motion spans 360° in the pan axis.

10. The aerial videocamera kit of claim 5 wherein mounting bracket motion spans 180° in the tilt axis.

11. The aerial videocamera kit of claim 5 wherein said mounting bracket supports up to 20 lbs at airspeed up to 100 knots.

12. The aerial videocamera kit of claim 5 wherein said control wand incorporates a display.

13. The aerial videocamera kit of claim 12 wherein said display is a LCD display.

14. The aerial videocamera kit of claim 5 wherein said control wand incorporates a joystick.

15. The aerial videocamera kit of claim 14 wherein said pan/tilt controller interprets inputs from said joystick using proportional control.

16. The aerial videocamera kit of claim 5 wherein said control wand incorporates a camera zoom control.

17. The aerial videocamera kit of claim 5 wherein said control wand incorporates a camera start/stop pushbutton control.

18. The aerial videocamera kit of claim 17 wherein said a wand stabilization mechanism is a velcro strap for leg mount.

19. The aerial videocamera kit of claim 17 wherein said a wand stabilization mechanism is a foot for placement between the legs of said operator.

20. The aerial videocamera kit of claim 5 wherein said control wand incorporates a wand stabilization mechanism.

21. The aerial videocamera kit of claim 5 wherein said power package draws 12 VDC power and provides up to 100 watts of 115 VAC.

22. A method of stabilizing a high-performance aerial videocamera suspended from an airplane in a pod assembly including an environmental enclosure comprising:

rigidly mounting said pod assembly to said airplane;

said pod assembly resisting large amplitude wind forces acting perpendicular to said pod assembly;

passing small amplitude high frequency wind force vibrations to said environmental enclosure;

attenuating airplane vibrations and said small amplitude high frequency wind force vibrations by a foam material having a predetermined spring constant and predetermined viscous damping coefficient, said foam material wrapped around said videocamera inside said environmental enclosure; and compensating for motions within a predetermined frequency band using a motion compensation system supplied with said videocamera.

23. The method of claim 21 wherein said large amplitude wind forces are up to those generated a speed of 100 knots.

24. A method of modeling the dynamic relationships and properties of an aerial videocamera system to determine the properties of a foam material; comprising selecting a videocamera with a predetermined cutoff frequency of a motion compensation system and specified compensation vibration amplitude;

entering variables representing airplane vibration frequency and amplitude and a camera mass of the motion compensation system inside said aerial videocamera;

applying the three dimensional equation of motion for a mass suspended by springs and dash pots; and determining a foam spring constant and foam viscous damping co-efficient required to enable said foam material to reduce said airplane vibration amplitude below said specified compensation vibration amplitude.

\* \* \* \* \*